United States Patent [19]

Baychar

[11] Patent Number: 5,738,937
[45] Date of Patent: Apr. 14, 1998

[54] WATERPROOF/BREATHABLE LINER AND IN-LINE SKATE EMPLOYING THE LINER

[76] Inventor: Baychar, Snobrook, 2506 Sugarloaf Mountain, Carrbassett, Me. 04947

[21] Appl. No.: 747,340

[22] Filed: Nov. 12, 1996

[51] Int. Cl.⁶ .................. B32B 3/26; A43B 7/06; A43B 13/38; A43B 23/07
[52] U.S. Cl. .................. 428/316.6; 428/304.4; 428/318.4; 36/3 R; 36/44; 36/55
[58] Field of Search .................. 428/304.4, 316.6, 428/318.4; 36/3 A, 3 B, 3 R, 44, 55, 115

[56] References Cited

U.S. PATENT DOCUMENTS

| | | |
|---|---|---|
| 4,909,523 | 3/1990 | Olson . |
| 5,092,614 | 3/1992 | Malewicz . |
| 5,330,208 | 7/1994 | Charron et al. . |
| 5,340,132 | 8/1994 | Malewicz . |
| 5,342,070 | 8/1994 | Miller et al. . |
| 5,380,020 | 1/1995 | Arney et al. . |
| 5,397,141 | 3/1995 | Hoshizaki et al. . |
| 5,398,948 | 3/1995 | Mathis . |
| 5,437,466 | 8/1995 | Meibock et al. . |
| 5,452,907 | 9/1995 | Meibock et al. . |
| 5,456,393 | 10/1995 | Mathis et al. . |
| 5,503,413 | 4/1996 | Belogour . |
| 5,544,908 | 8/1996 | Fezio . |

*Primary Examiner*—Terrel Morris
*Attorney, Agent, or Firm*—Fay, Sharpe, Beall, Fagan, Minnich & McKee

[57] ABSTRACT

The breathable liner includes an inner liner selected from highly advance fabrics which are carefully selected. A series of layers are provided outside the inner liner including foam material layers, breathable membranes, a supportive mesh or a moldable foam, and an outer shell fabric. An in-line skate using such a liner is also disclosed. Furthermore, the applicability of the liner to snowboard boots, alpine and cross country boots, as well as clothing is disclosed.

7 Claims, 11 Drawing Sheets

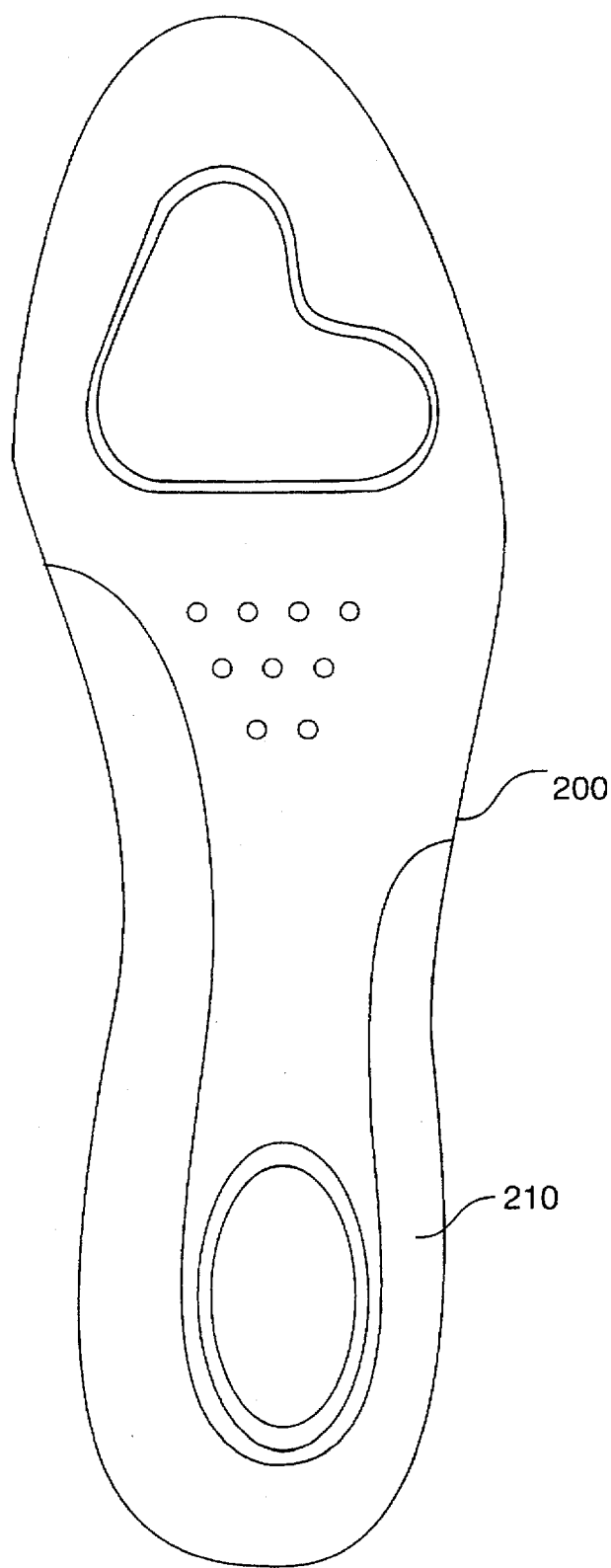
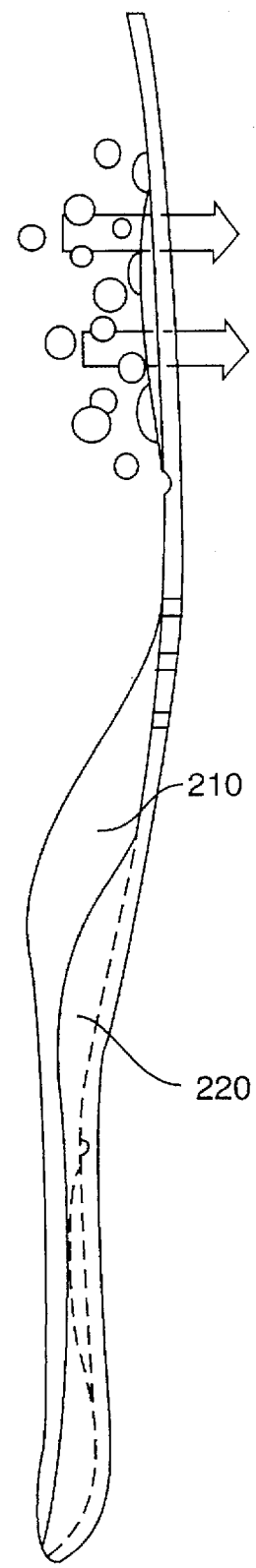
FIG. 5(a)  FIG. 5(b)

WATERPROOF/BREATHABLE LINER AND IN-LINE SKATE EMPLOYING THE LINER

FIELD OF THE INVENTION

The present invention relates to liners used in a variety of application. For example, the liner of the present invention may be employed in a variety of applications including in-line skates (shell and soft boot), snowboard boots, alpine boots, cross-country boots, downhill boots and even apparel such as shirts. The liner is breathable and waterproof to increase comfort for the user.

BACKGROUND OF THE INVENTION

Various types of liners are known in the prior art. These liners are designed to provide certain levels of comfort and durability. Furthermore, in-line skates are also well known in the art as evidenced by U.S. Pat. Nos. 5,340,132, 5,397,141 and 5,437,466. Of these patents, only U.S. Pat. No. 5,437,466 discloses what is commonly referred to as a "soft-boot". In other words, the shoe body is made of a soft, pliable material. It is suggested that suitable materials for the shoe body include leather-like man-made materials, cloth fabrics and mesh fabrics. Specific details of any of the materials is not disclosed.

However, the liners and in-line skates, as well as snowboard boots, etc., known in the art do not provide the advantages realized by the present invention. With the art of in-line skating is becoming increasing recreational, numerous categories of skaters are developing in large numbers. The present inventor has recognized the problems faced by the aggressive and the recreational categories of skaters and has developed a liners to overcome such problems.

There is an ongoing need for comfort, breathability and support for both removable liners as well as soft boot liners. In prior removable liner designs, the conventional liner is often constructed with rigid, non-breathable outer materials, such as vinyl's, foams and nylons. The inner liners have been leather, nylon or polyester blends which extremely limited the ability to breathe or wick moisture away from a user's body. These materials have prevented the foot from breathing adequately. In the case of "shell boot" skates, the plastic material that forms the outer shell boot structure holds the heat and moisture inside the boot. As a result, the lining becomes saturated with sweat which adversely affects the user's comfort and performance level. This problem is even worse with the aggressive skaters whose needs for proper ventilation are even greater.

SUMMARY OF THE INVENTION

An object of the present invention is to provide lining system employing a cooler and more breathable liner that meets the needs of each individual skater. Accordingly, the liner of the present invention can be accommodated to the needs of skaters of the various skate categories by permitting the inner liner material, which is against the foot, to vary in fiber content and construction.

This object of the present invention is realized by providing a lining system having lining materials which act as a moisture transfer system. Moisture vapors are transferred through the liner from one side to the other side.

According to a preferred embodiment of the present invention, the lining system is constructed from a number of elements. First an inner liner is constructed from one or more carefully selected fabrics.

The first fabric is an antimicrobial polypropylene (also referred to as polyolefin) lycra blend (2%) with INNOVA fiber. INNOVA is a continuous filament fiber.

The second fabric is an antimicrobial polypropylene having a polyester or cotton backing. For uses such as for alpine boots, the cotton backing can be replaced with wool or silk.

The third fabric is an antimicrobial polypropylene/cotton blend with ALPHA fiber. ALPHA is a staple fiber.

The fourth fabric is a field sensor polyester with waffle weave construction.

The fifth fabric is a hydrofilic antimicrobial Dri-lex nylon. Such nylons are manufactured by Faytex.

The sixth fabric is a polyester looped Terry.

Finally, the seventh fabric is a polyester microfiber material.

The polypropylene does not absorb moisture, only transfers the moisture. All of the fabrics above wick moisture away at varying degrees.

Different types of these fabrics can be used in different parts of the in-line skate or other device being manufactured. Also, different combinations of these fabrics may be used in specific locations.

In the case of in-line skates and the like, a major part of the shoe would incorporate one or more of the above disclosed liner materials as an inner liner and then employ the following materials outside the inner liner in the following order: a first germicidal reticulated foam, a second germicidal reticulated foam, a flexible mesh or moldable foam, a third inch germicidal reticulated foam (used only if a flexible mesh is used), a breathable membrane and an outer shell (fabric). These materials function to remove moisture away from a user's body, thereby increasing comfort and improving performance.

The moisture transferring liner of the present invention overcomes the problems in the prior art lining systems and liners and meets the needs of even the most aggressive skaters.

Other objects, features and advantages of the present invention will become readily apparent in view of the following detailed description of the preferred embodiments in conjunction with the drawings.

BRIEF DESCRIPTION OF THE DRAWINGS

FIGS. 5(a) and 5(b) illustrate a sole portion of a shoe constructed according to a preferred embodiment of the present invention.

DETAILED DESCRIPTION OF THE PREFERRED EMBODIMENTS

The following detailed description of the preferred embodiments of the present invention is undertaken in connection with the drawings. This description, while undertaken with respect to the disclosed embodiments, is intended to enable a variety of different applications and slight modifications which form a part of the present invention as claimed. More specifically, many of the materials used in this lining system have been developed relatively recently, and in many cases are still being modified and improved. Where possible, tradenames of specific products have been used to assist in the understanding of the invention. The lining system according to the present invention can be easily adapted to accommodate further developments in these materials. With this in mind, the preferred embodiments currently envisioned are set forth below.

Figure 1:
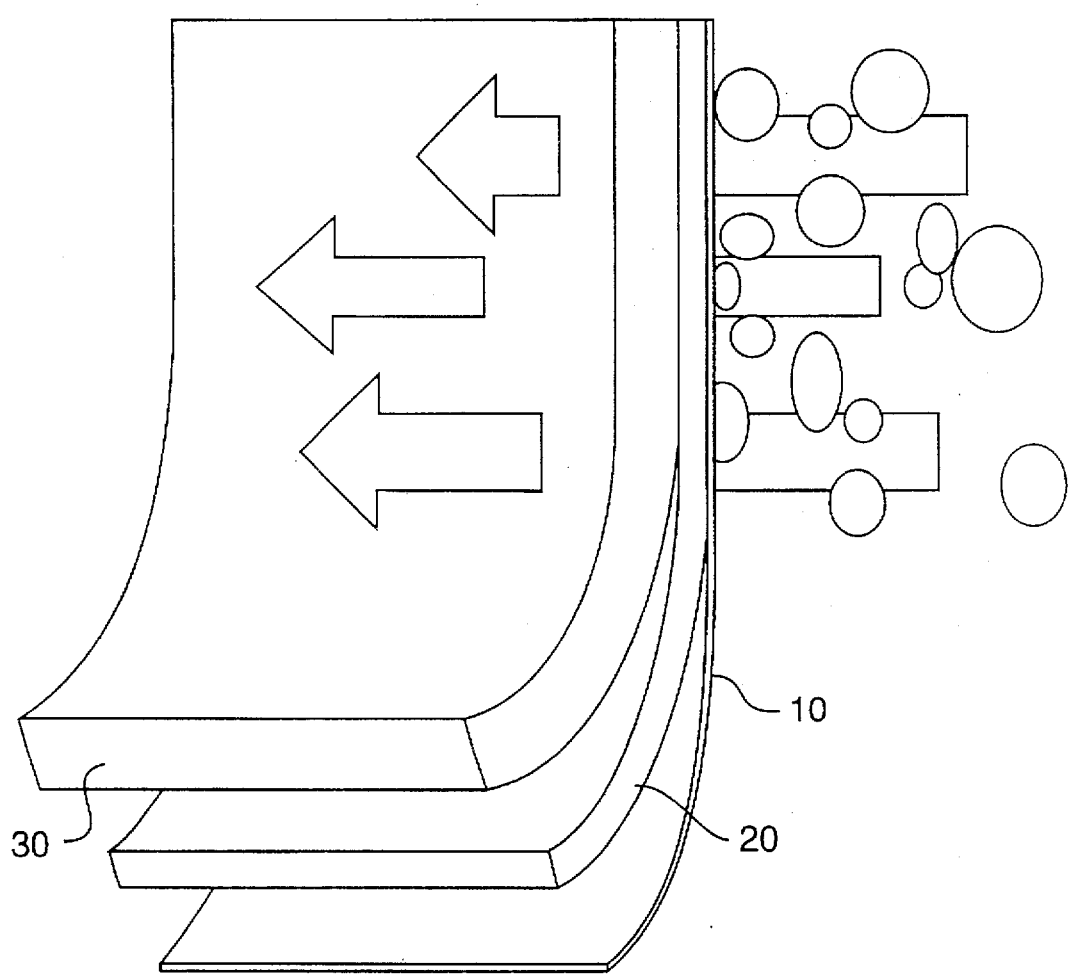
FIG. 1 illustrates a first portion of the liner according to a first embodiment of the present invention.

FIG. 1 illustrates a portion of the liner, or lining system, according to a first embodiment of the present invention. As shown in FIG. 1, a first foam material 20 is provided between an inner liner 10 and a second foam material 30. The inner liner 10 can be attached to the first foam material 20 by lamination or the like. Preferably, second foam material 30 is a germicidal and reticulated foam and has a thickness of approximately ¼ inch. The first foam material is also preferably germicidal and reticulated and has a thickness of approximately ⅛ inch. All of the foam materials used in the present invention are assumed to be breathable.

The inner liner 10 is preferably constructed using specific fabrics possessing certain desired characteristics. A list of fabrics which can be employed depending upon the individual needs of their application as well as the individual needs of each user are provided below. These fabrics may either be used individually or in combination.

The first fabric is an antimicrobial polypropylene (also referred to as polyolefin) LYCRA® a spandex fiber fabric, blend (2%) with INNOVA fiber. INNOVA is a continuous filament fiber (manufactured by Deercreek Fabrics, Inc.).

The second fabric is an antimicrobial polypropylene having a polyester or cotton backing (manufactured by Coville, Inc.). For uses such as for alpine boots, the polyester or cotton backing can be replaced with wool or silk.

The third fabric is an antimicrobial polypropylene/cotton blend with ALPHA fiber (manufactured by Intex Fabric, Inc.).

The fourth fabric is a field sensor polyester with waffle weave construction (manufactured by Yagi & Co., Inc.).

The fifth fabric is a hydrofilic antimicrobial Dri-lex nylon (manufactured by Faytex Corp.).

The sixth fabric is a polyester looped Terry (manufactured by Kronfli, Inc.).

Finally, the seventh fabric is a polyester microfiber material (manufactured by Yagi & Co., Inc. and Teijin Shojin, Inc.).

All of these fabrics have good moisture transfer characteristics which prevent damage to a user's foot by preventing excessive moisture built-up.

The moisture transfer characteristics of the inner liner 10 causes moisture vapors to be passed from a user's body through the inner liner where it then comes into contact with the first foam material 20. The moisture vapors travel through the first foam material 20 and come into contact with the abutting second foam material 30.

Figure 2:
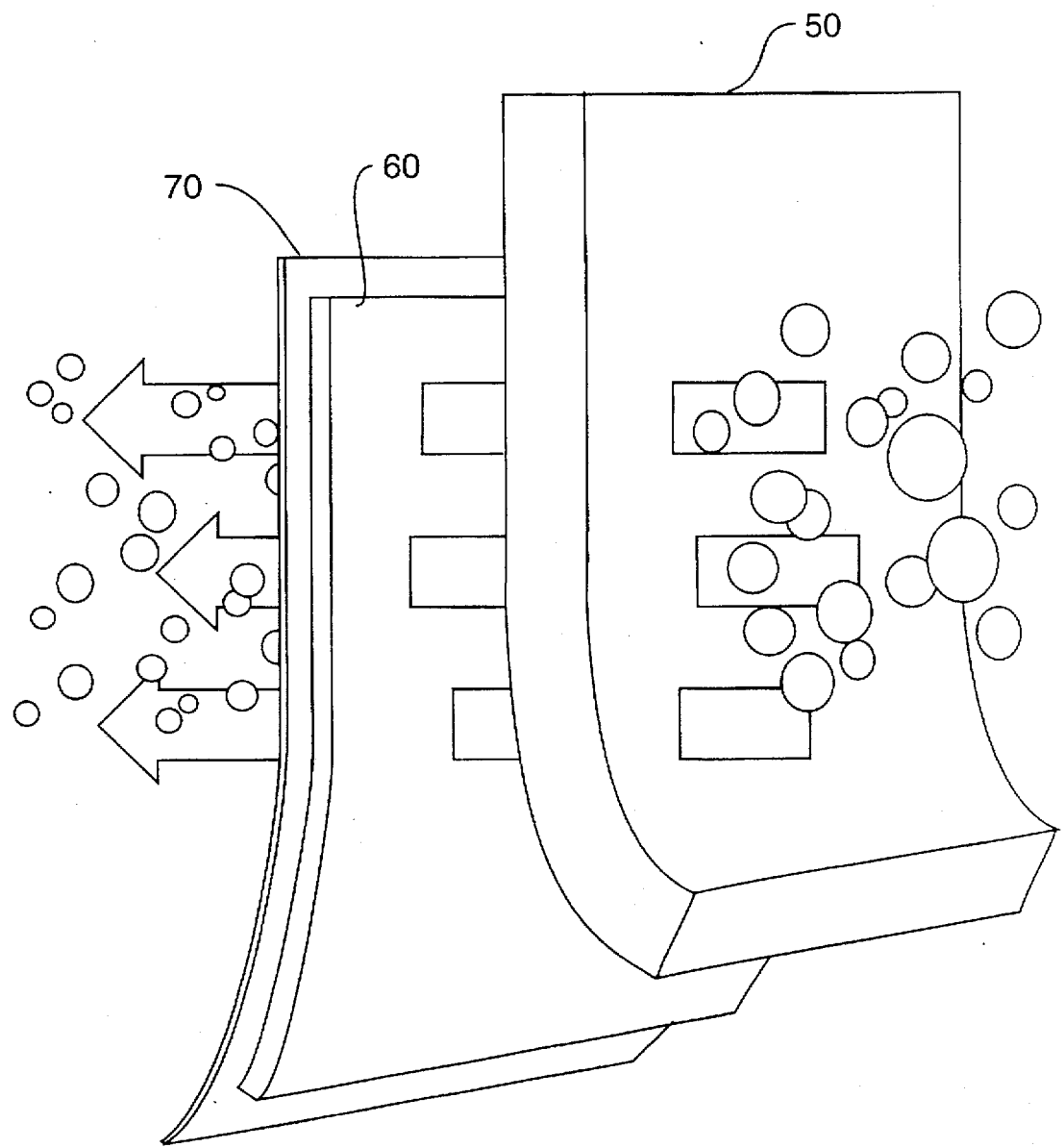
FIG. 2 illustrates a second portion of the liner according to a first embodiment of the present invention.

As shown in FIG. 2, a third foam material 50, which provides support and has similar characteristics to the second foam material 30, allows the moisture vapors to continue their movement toward the outer shell. This third foam material 50 is formed in certain areas to take necessary shapes such as the shape of an ankle, heel cup and foot bones and is positioned so as to allow the moisture to pass through into subsequent elements, such as waterproof/breathable membrane 60 and the outer shell 70 of the overall lining system. The third foam material 30 can be designed to provide a well defined heel lift, and heel pocket. Women skaters in the industry often complain that such features have not been properly addressed. This invention develops the components necessary to increase technical performance with the increased support around the heel, toe and ankle. The toe box is from top to bottom, wider and more flexible than in previous liners, specifically those described in U.S. Pat. Nos. 5,092,614 and 5,397,141. The laminated foams under the heel support the skaters lower back and allows for a comfortable stride. With this added comfort, the aggressive or recreational skater can achieve a higher level of continued performance.

Figure 3:
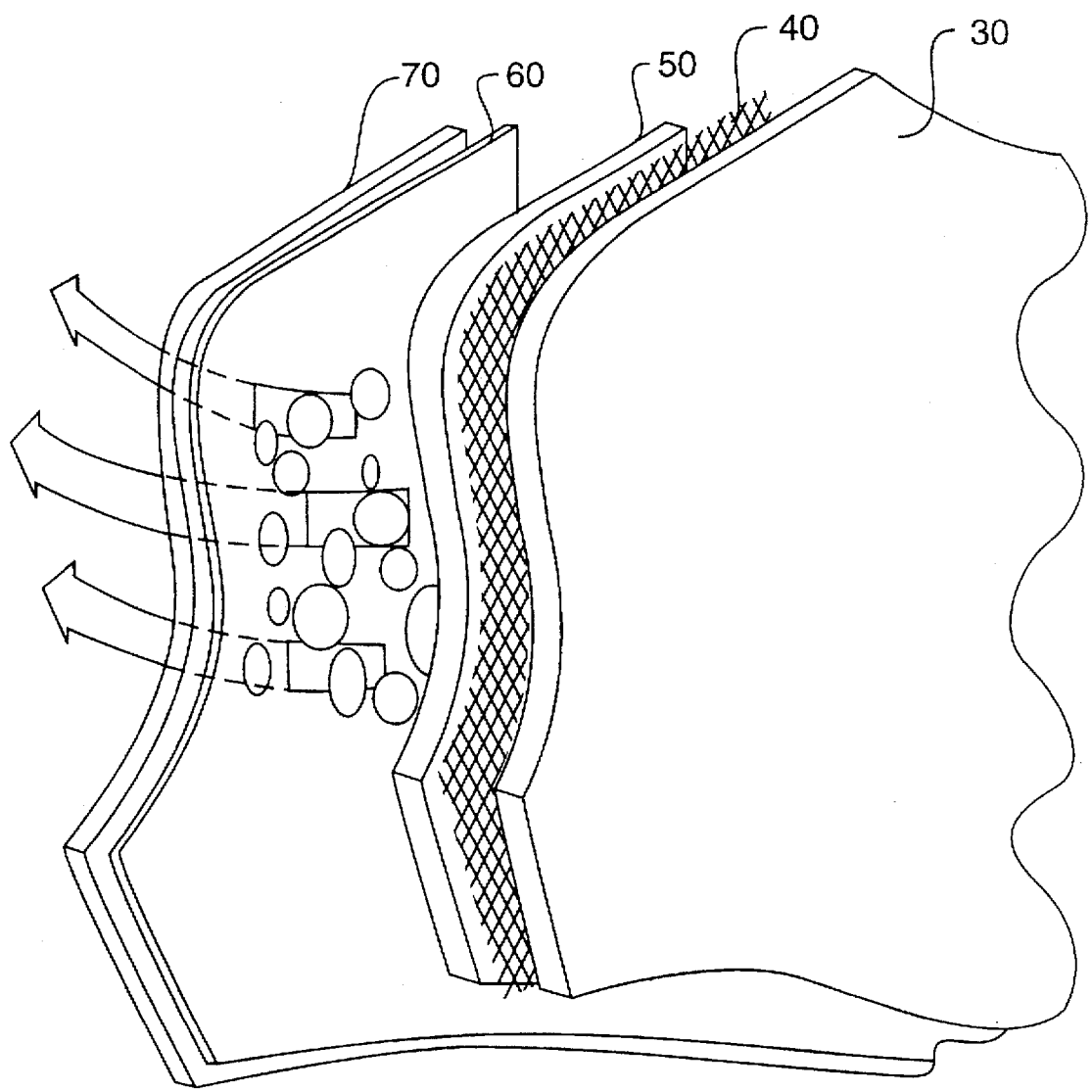
FIG. 3 illustrates an example of the liner according to the first embodiment of the present invention.

As shown in FIG. 3, between the supporting second foam material 30 and the third foam material 50 is a structural mesh 40 which is a flex guard, such as one manufactured by NALTEX, for example, that adds structural integrity to the lining system. A moldable foam may also be used in place of this flex guard, which is made breathable by being punctured, having open cells, or the like. If a moldable foam is used, then the second foam material may be omitted. As mentioned earlier, the second foam material 50 is preferably similar in construction to the second foam material, namely being germicidal, reticulated and approximately ¼ inch thick.

Figure 4:
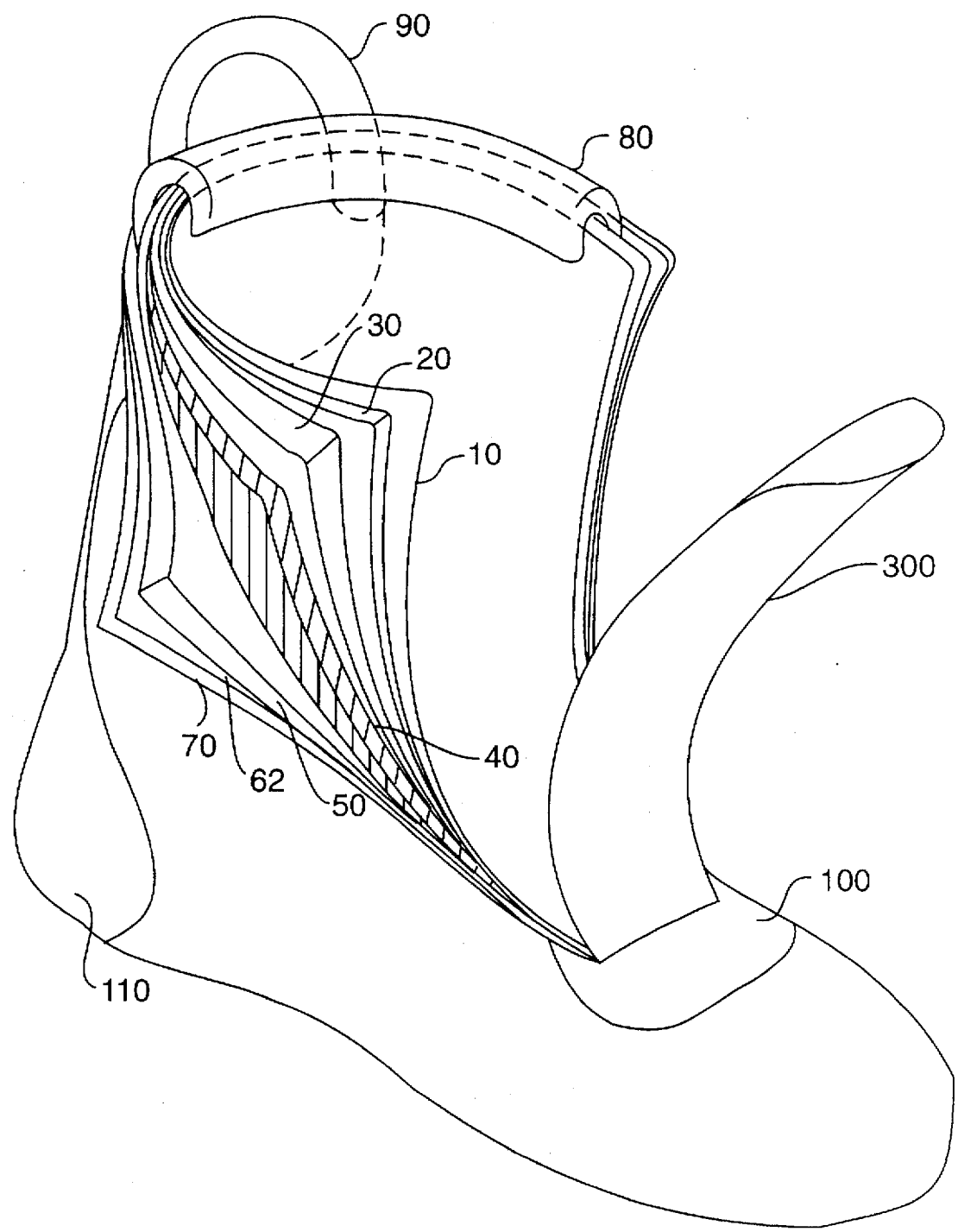
FIG. 4 illustrates the liner shown in FIG. 3 as applied to an inline skate.

The moisture vapor continues from the second foam material 30 through the mesh 40 and on through the third exterior foam material 50. The moisture vapors are then passed through waterproof/breathable membrane 60. The moisture vapors are absorbed into the waterproof/breathable membrane and passed through to an outer layer of fabric 70, as shown in FIG. 4. The waterproof/breathable membrane 60 can be selected from a variety presently available on the market. Those under the tradenames VAPEX 2000/PLUS/ STANDARD/1300, THINTECH and LAY-TEK are currently being considered. However, the membrane currently considered to be the preferred one is called SECO-TEX (application by Shawmut Mills), which is intended to be an ultra-thin, skin friendly, moisture barrier that allows moisture vapors to escape while preventing outside water from penetrating.

Also shown in FIG. 4 is a protective rim or cuff 80, preferably made of neoprene lycra. A pull tab 90, preferably made of nylon, is connected to the protective rim 80. A abrasive protective material 100 is provided adjacent to a tongue 300. Another abrasive protective material 110 is provided around the heel portion of the shoe. Abrasive protective material 110 is supplied by Teijin Shojin, Inc.

The outer layer of fabric 70 of the lining system has 2000 to 6000 denier strength and is made waterproof by a membrane or encapsulation technology. Encapsulation technology is being utilized by a company called Nectex, Inc. The breathable membranes preserve the outer layer of fabric 70 and perform as a waterproof barrier for the liners. If the encapsulation technology is applied to the outer layer of fabric 70, then the breathable laminate membranes need not be used. The outer layer of fabric 70 is a combination of extremely durable, lightweight materials, kevlar products (manufactured by Schoeller, Inc. under product number 6500), nylon supplex (such as that manufactured by Travis Textiles, Inc. or Blank Textiles, Inc.), nylon cordora (manufactured by Schoeller, Inc.), maxus 6 ply (manufactured by Blank Textiles, Inc.) or starlite Dri-lex nylon fabric (manufactured by Faytex Corp.), Mojave or Tudor (both manufactured by Travis Textiles, Inc.), or other fabrics having similar characteristics as these new products.

Selecting the proper materials depends upon the needs of each individual skater. The non-abrasive cool fabrics used in the inner liner of the present invention greatly reduces the possibility of trapped moisture, thereby protecting the foot from fungus growth and any damage. The more aggressive skaters need a moisture transfer liner that can remove large amounts of moisture continuously from the foot. These skaters often do not wear socks and as a result, calluses, abrasions and blisters become commonplace. The antimicrobial polypropylene (polyolefin) fabrics quickly removes moisture away from the foot. Skin damage in minimized because the polypropylene fabric has a smooth, continuous surface. This fabric also prevents bacterial build-up which can cause foot odor and fungus.

The polyester looped terry blend is an excellent wicking fabric and can remove moisture rapidly.

The antimicrobial, Dri-lex nylon fabrics, like the polypropylene, is sanded and soft. The material not only removes moisture from the foot, but also is extremely comfortable and cool to the touch.

The polyester field sensor fabric works well with those individuals who prefer sports or recreational skating. This liner absorbs moisture immediately. However, it is recommended for those skaters who wear socks.

Finally, polyester microfiber fabric is advantageous in that it is smooth and comfortable.

As a result of using this lining system, the user continues to have a cooler, drier foot. The lightweight kevlar, starlite and cordura outer liner materials are twice as durable as the former heavyweight nylons often used on the outer shell, but function as a softer feeling breathable outer surface and aid in the moisture transfer.

FIGS. 5(a) and 5(b) illustrate a sole portion 200 of a foot foam pad covered with cambrelle Dri-lex nylon. The inserted hydrofilic foam (an open cell moisture vapor transfer foam) foot pad adds support and transfers moisture downward. The heel pocket foam protects the back of the heel with a double layered reticulated support foam. This cushion protector allows circulation in the heel. A "DRI-LEX" antimicrobial cambrelle Dri-lex nylon 210 covers a molded hydrofilic foam 220 that supports the arch and insures the skater a comfortable stride.

Figure 6:
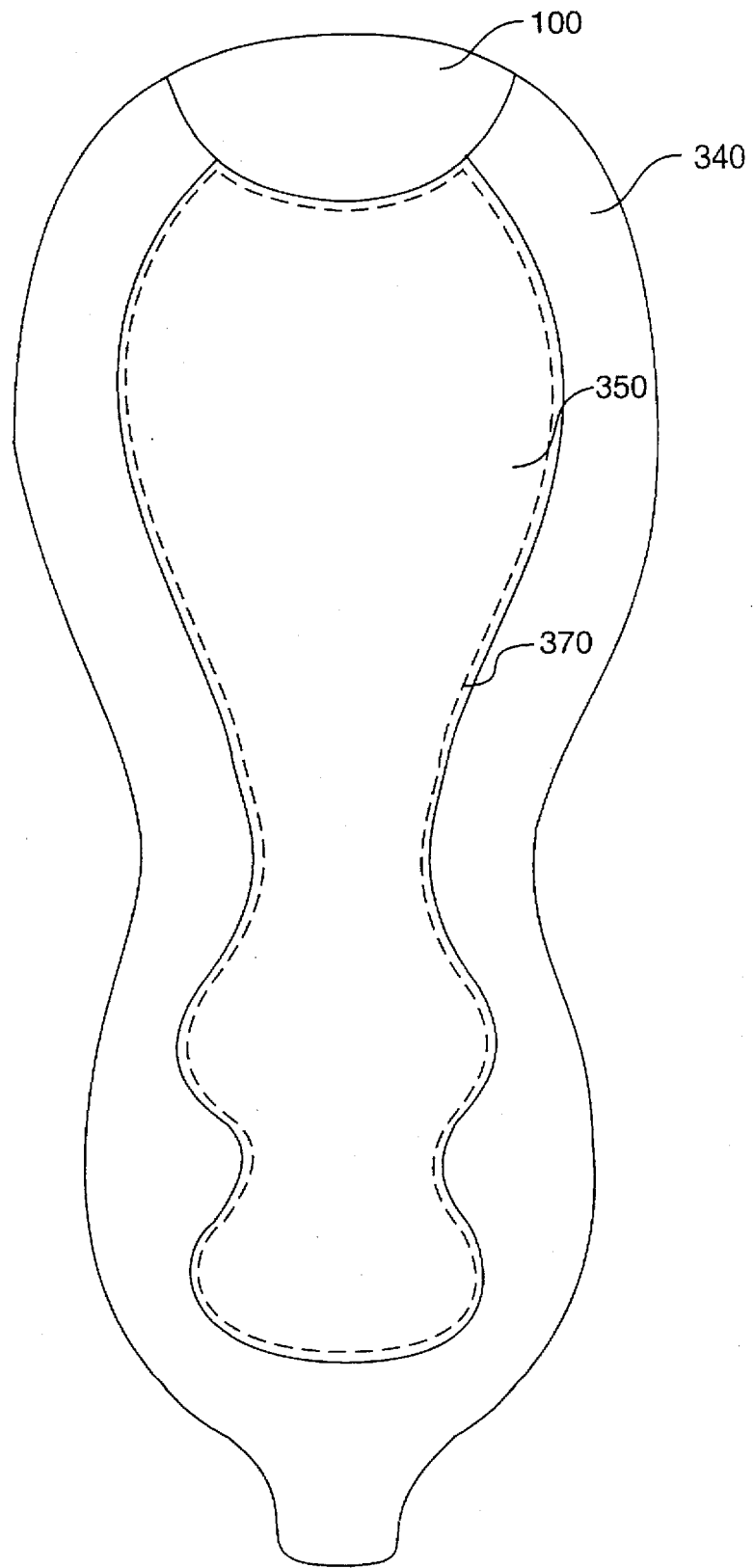
FIGS. 6 and 7 illustrate a tongue portion of a shoe constructed according to a first embodiment of the present invention.
Figure 7:
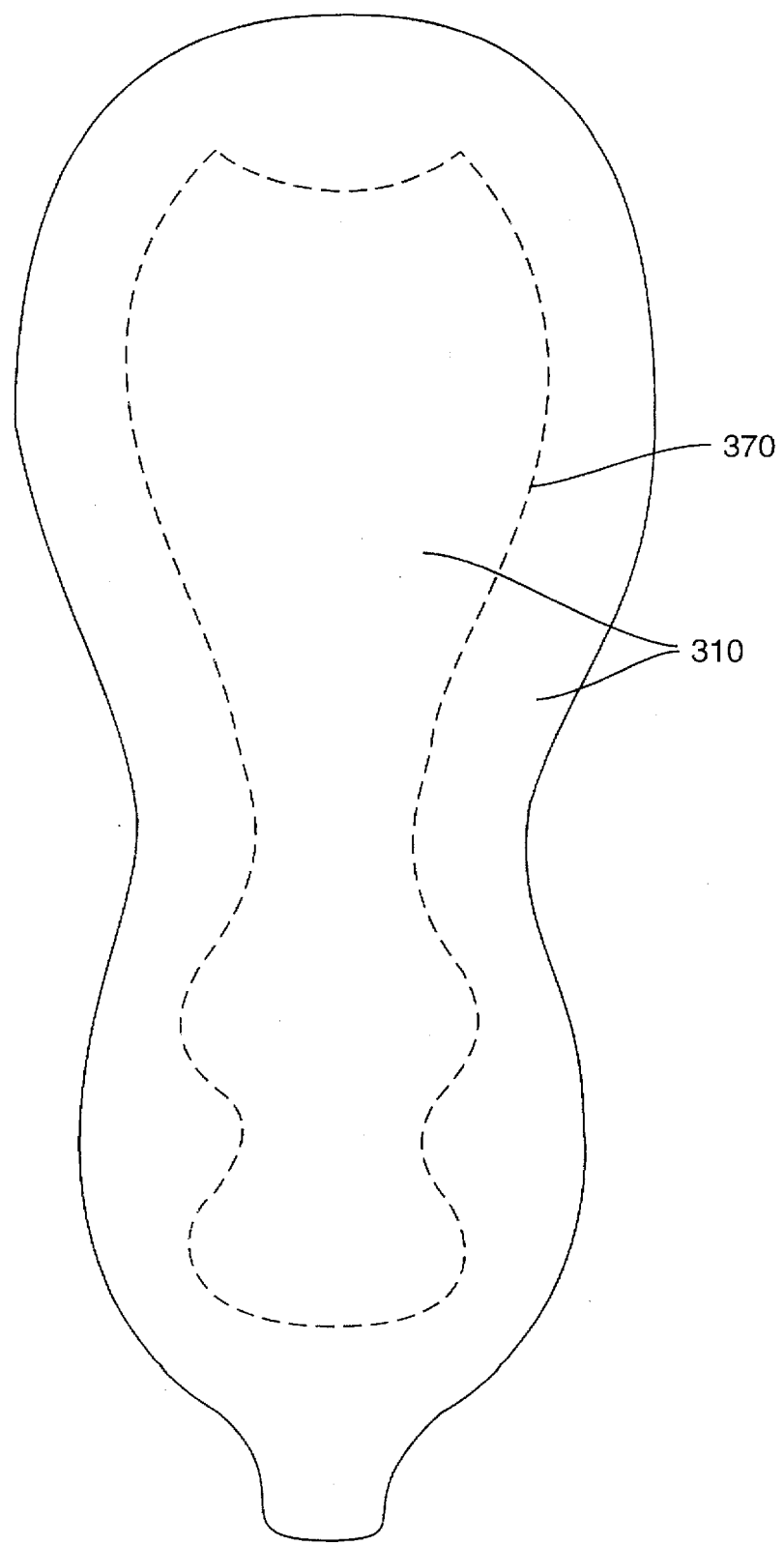
Figure 8:
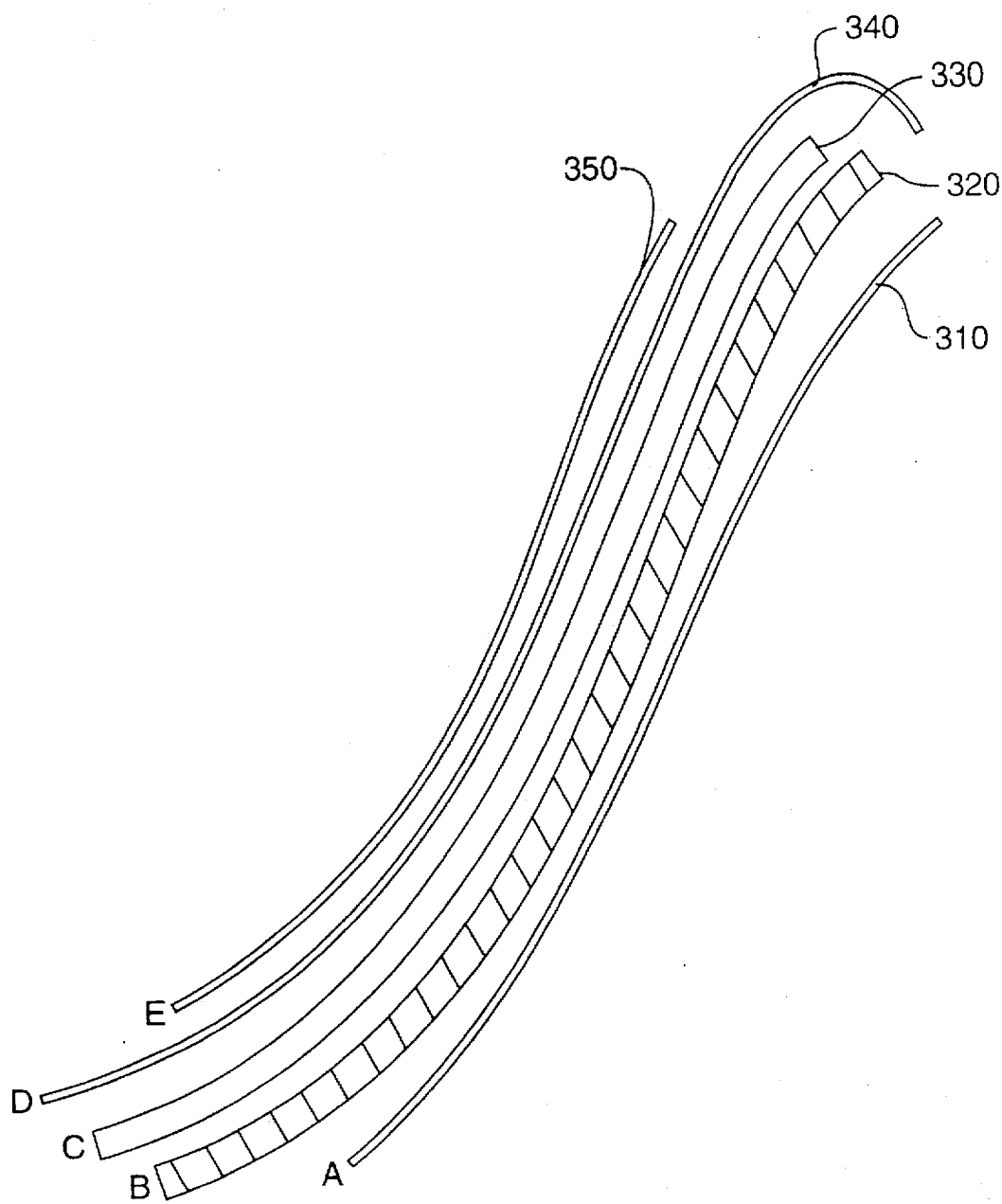
FIG. 8 illustrates a more detailed view of the liner portion used for the tongue of FIGS. 6 and 7.

FIGS. 6, 7 and 8 illustrate the tongue 300 of the boot in more detail. The tongue is designed to add further comfort and support. As shown in FIG. 8, an inner liner fabric 310 of the tongue 300 is preferably a sanded hydrofilic Dri-lex nylon. This inner liner fabric 310 is preferably laminated to a structural support foam 320, which is preferably a ¼ inch germicidal, reticulated foam. A hydrofilic perforated foam 330 abuts a structural support foam 320. The hydrofilic perforated foam 330 can take the shape of the foot bones and protect the upper foot from damage. The structural support 320 can also be shaped to accommodate the foot and protect the ankle bones. A moisture transfer material 340 lies over the hydrofilic perforated foam 330. This moisture transfer material 340 is preferably made from a material known as aero-spacer DRI-LEX, which is manufactured by Faytex Corp. This material 340, is wrapped around the outer edge of the tongue to allow moisture vapors traveling from the upper foot area to escape to the outer surface of the tongue portion 300. Material 340 also aids in providing a softer edged tongue. Finally, an outer protective polyurethane layer 350 is provided over a central portion of the material 340. Another molded foam (not shown) is shaped to fit between the outer protective polyurethane layer 350 and material 340.

As shown in FIG. 6, polyurethane or synthetic leather layer 350 is surrounded by aero-spacer Dri-lex 340. At the top of the tongue 300 is an abrasive grip fabric 100 (such as a that is manufactured by Schoeller and identified by the number 6500), also shown in FIG. 4. Stitching is identified by numeral 370. FIG. 7 illustrates a rear portion of the tongue 300, and shows stitching 370 and the inner liner fabric 310.

In-line skate tongues have in the past been hard vinyl edged forms. The shape of these tongues often did not fit the skater's foot. Furthermore, vinyls may damage the upper foot where they meet the inner lining edge during active use of the in-line skate. As a result, the skater may develop blisters, calluses or bruises on this upper foot area. Additionally, the inner fabrics of the tongue liner have often been non-breathable nylon or vinyl, thereby increasing the possibility of foot bacteria fungus to develop.

Figure 9:
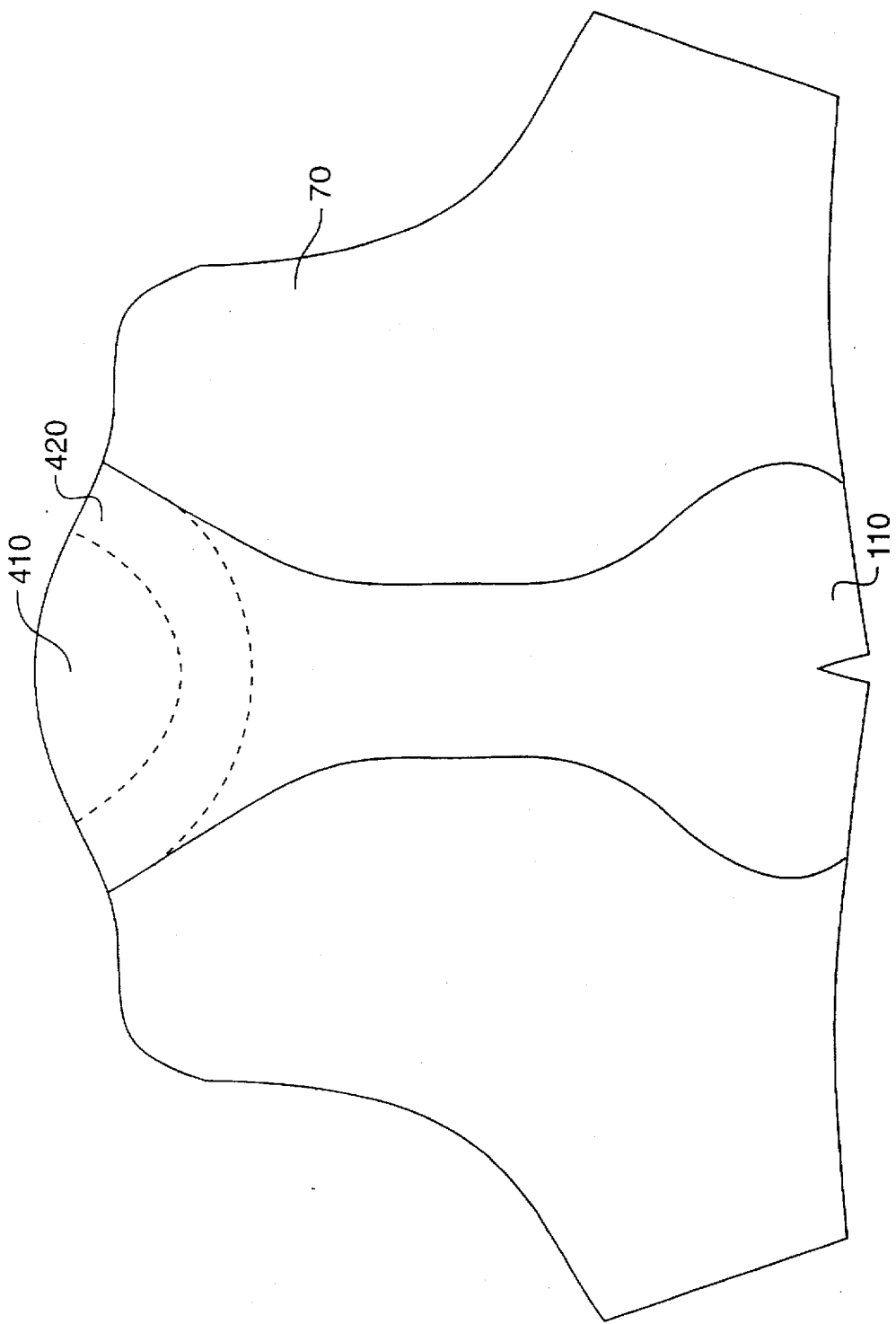
FIG. 9 illustrates a portion of the liner used in the upper cuff area.
Figure 10:
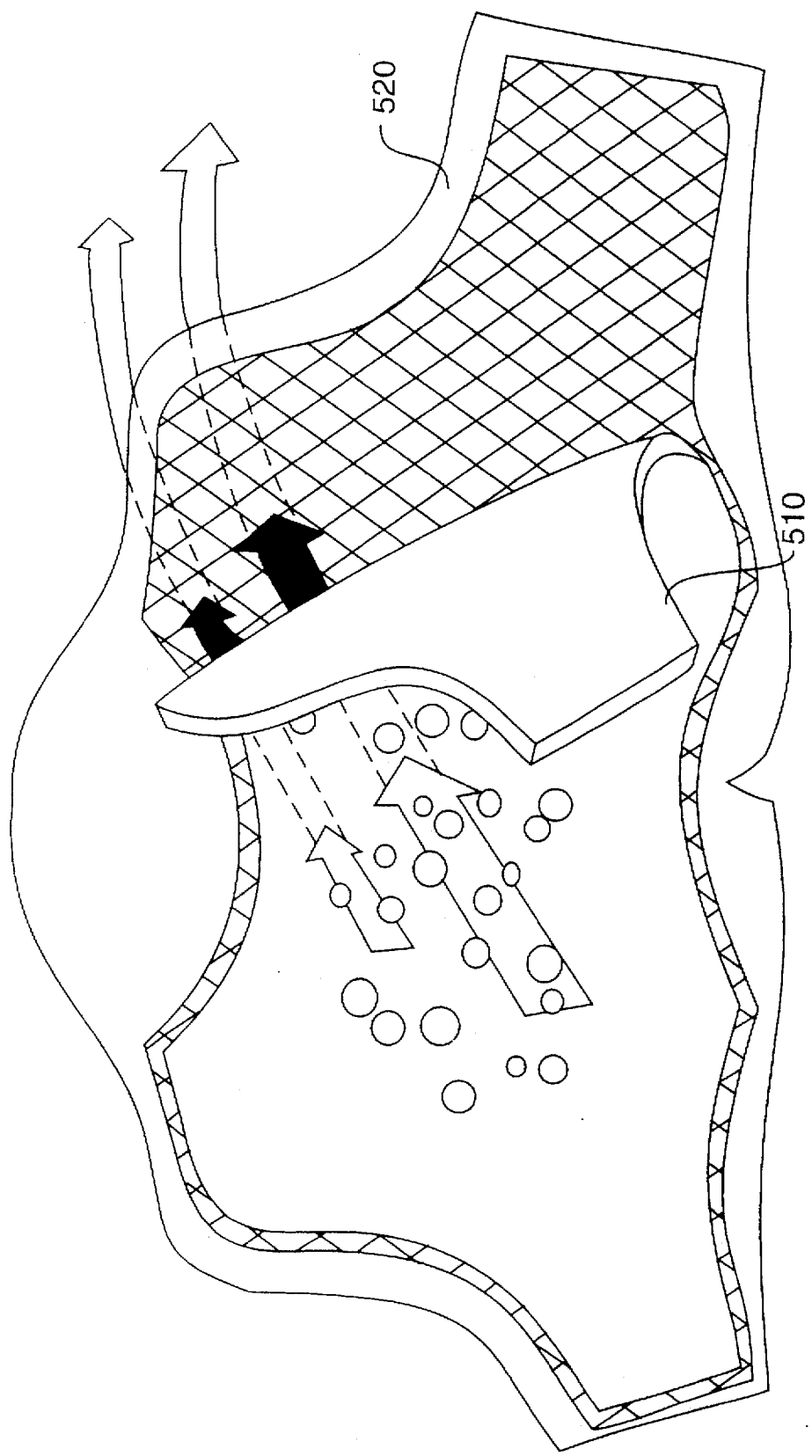
FIG. 10 illustrates the travel of moisture through a reticulated foam then a flexible mesh and into and through a breathable membrane according to the first embodiment of the present invention.

The liners are preferably provided with a pull tab 90 as illustrated in FIGS. 4, 9 and 10 on the back of a cuff 80 constructed of neoprene covered by LYCRA®. FIG. 9 shows an opened up version of the liner looking from the back of the shoe. The outer upper cuff, that is exposed above the shell of the in-line skate removable liner, is provided to protect a user's leg from abrasion. Located just beneath the LYCRA® covered neoprene cuff 80 is a abrasive grip fabric material 410, such as that manufactured by Schoeller, Inc. and referred to by the number 6500. Below material 410 is a reflective grip material 420. Below the reflective grip material 420 is a highly abrasive fabric 110, as shown in FIG. 4. Fabric 110 is preferable a Kevlar or Starlite, not a cordura. Finally, outer shell fabric 70 is the same as that shown in FIG. 4, and can be any of the fabrics listed previously in connection with outer shell fabric 70. The nylon pull tab 90 allows the skater to easily slip into the liner.

FIG. 10 shows the other side of the liner of FIG. 9. In FIG. 10, 510 can be a ¼ inch foam the moldable foam which has been punctured or the like. 520 represents the combination of the flexible mesh (in the case the moldable foam in not used, as depicted), the breathable membrane and the outer shell fabric. As in all of the Figures, the arrows depict the flow of moisture.

Figure 11:
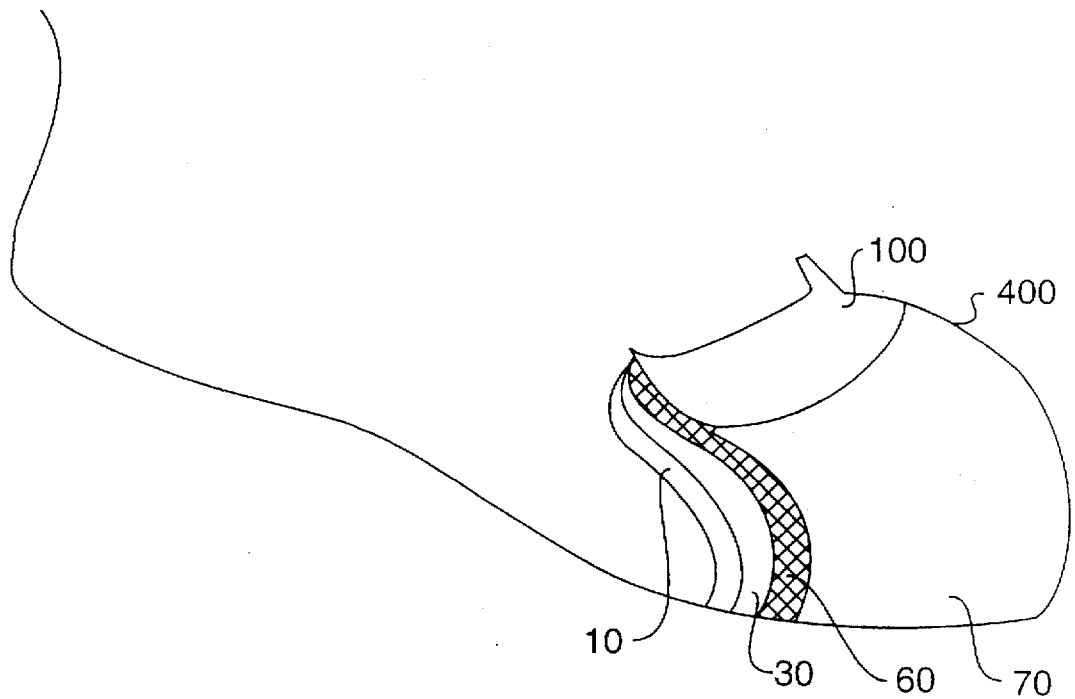
FIG. 11 illustrates the toe portion of a shoe according to a preferred embodiment of the present invention.

FIG. 11 illustrates the toe portion 400 of the shoe. Preferably, the toe portion 400 is constructed with an inner liner 10, followed by a foam material 30, followed by a breathable membrane 60 and finally followed by the outer fabric 70. Abrasive grip fabric 100 is also shown.

The 6500 high abrasive fabrics manufactured by Schoeller, Inc. are located on the back of the cuff and the top of the toe box. The Kevlar, starlite and cordura fabrics provide comfort and durability to the liners and are extremely strong and resistant to abrasion and allows for breathability and performance.

The microfiber technology disclosed above is rapidly developing and changing and has greatly increased the potential for improved performance of such products such as in-line skates, provided that they are properly utilized as in the present invention. These new products are part of rapidly developing fabric technology. The present invention employs a combination of fabric and foam layers with breathable membranes in such combinations that increase the performance of the products in which they are used as well as increase breathability. The breathable membranes have also only recently developed and are believed to be less that ten years old.

It should be noted that, in the case of in-line skates, the lining system of the present invention can be applied to both shell boots and soft boots. The soft boot in-line skate, mentioned earlier in the Background of the Invention, addressed the needs of a skater to have more flexibility and comfort yet still maintain performance levels. This new technology in the in-line skate industry has increased tremendously the possibilities of a lighter weight performance product. However, the soft boot in-line skate does not have any type of lining system that even remotely resembles the lining system of the present invention. The liner of the soft boot can be adapted to this new moisture transfer system.

While the soft boot does not have a protective shell, nor a removable liner, it can nonetheless be provided with a liner that enjoys all of the benefits of the liner according to the present invention. Preferably, the outer layer of the moisture transfer system for the soft boot application would be a starlite Dri-lex nylon, Kelvar, or heavy weight cordura fabric. These fabrics, as well as the high abrasive fabrics, are provided with a waterproof/breathable membrane laminated to their back side. A reticulated ¼ foam abutting the membrane would have nylon mesh (such as the flex guard by NALTEX) or a moldable support foam (this foam is hydrofilic and punctured) located between itself and the next layer of ¼ inch foam (which is used only when the nylon mesh is used). The ¼ inch foam abuts an ⅛ foam that is laminated to the inner liner. Also, instead of being removable, the liner would preferably be directly attached to the base of the soft boot by methods well known in the art, such as that disclosed in U.S. Pat. No. 5,437,466. Other aspects of the present invention can be applied to the soft boot without any significant structural changes. The soft boot density is increased in the footbed, toe box, and heel plate. This added support provides, protection and assist in maintaining technical performance levels. The in-line soft boot breathability would be greatly enhanced with this added moisture transfer liner system.

While the present disclosure has been set forth primarily in connection with in-line skates, the lining system of the present invention can easily be applied to a snowboard boot by increasing the amount of structural support foam and by replacing the outer shell material with a synthetic breathable leather (such as that available from Daowoo, Inc.) or a waterproofed material (such as that available from Malden Mills, Inc. and referred to as 2978, 2979 and foot wearliner). The inner liner would need a waterproof/breathable membrane (such as the one referred to as Outlast Technology) added to it to accommodate winter conditions. Similar applications can be made with alpine or cross country boots, with slight modifications. For example, in the case of a cross country ski boot, the liner would preferably have a waterproofed outer fabric attached to a synthetic rubber base. Otherwise, the liner could be very similar, although the use of the supportive mesh could be limited to certain areas. The alpine ski boot liner would be similar to the removable liner for the shell boot in-line skate. Another liner available from Malden Mills, Inc. is a polyester blend, double sided, spacer fabric that could also be used as the liner. Adjustments in the breathable membrane would be made to accommodate winter conditions and cosmetic changes could be applied to the surface areas.

Furthermore, the breathable liner according to the present invention could also be added to clothing, such as shirts, pants, etc., by omitting elements such as the structural mesh and by adjusting the number of foam material layers and their thickness. For example, clothing preferably has a wickable inner liner, followed by an ⅛ inch thick foam, followed by a breathable membrane and then followed by an encapsulated outer fabric. Indeed, the amount of foam used can be reduced due to cost considerations, etc. Also, the breathable membrane may vary depending upon whether the liner will be used in the summer or winter, etc.

While the present invention has been described above in connection with the preferred embodiments, one of ordinary skill in the art would be enabled by this disclosure to make various modifications to the disclosed embodiments and still be within the scope and spirit of the present invention as recited in the appended claims.

What is claimed is:

1. A moisture transferring lining system comprising:

an inner liner;

a first foam material provided adjacent to the inner liner;

a second foam material provided adjacent to the first foam material;

a supporting element provided adjacent to the second foam material;

a third foam material provided adjacent to the supporting element;

a breathable membrane provided adjacent to the third foam material; and an outer fabric layer attached to the breathable membrane.

2. A system according to claim 1, wherein the first, second and third foam materials are germicidal, reticulated and breathable.

3. A system according to claim 2, wherein the supporting element is a flexible mesh material.

4. A system according to claim 2, wherein the supporting element is a moldable foam that has been rendered breathable.

5. A system according to claim 1, wherein the inner liner is selected from a group consisting of an antimicrobial polypropylene spandex blend, an antimicrobial polypropylene with a polyester or cotton backing, an antimicrobial polypropylene/cotton blend, a field sensor polyester, a hydrophilic antimicrobial nylon, a polyester looped terry, and a polyester microfiber material.

6. A shoe for an in-line skate having a liner comprising:

an inner liner;

a first foam material provided adjacent to the inner liner;

a second foam material provided adjacent to the first foam material;

a supporting element provided adjacent to the second foam material;

a third foam material provided adjacent to the supporting element;

a breathable membrane provided adjacent to the third foam material; and an outer fabric layer attached to the breathable membrane.

7. The shoe according to claim 6, wherein the inner liner is selected from a group consisting of an antimicrobial polypropylene spandex blend, an antimicrobial polypropylene with a polyester or cotton backing, an antimicrobial polypropylene/cotton blend, a field sensor polyester, a hydrophilic antimicrobial nylon, a polyester looped terry, and a polyester microfiber material.

* * * * *

UNITED STATES PATENT AND TRADEMARK OFFICE
CERTIFICATE OF CORRECTION

PATENT NO. : 5,738,937
DATED : April 14, 1998
INVENTOR(S) : Baychar

It is certified that error appears in the above-identified patent and that said Letters Patent is hereby corrected as shown below:

Column 8, line 6, delete "encapsulated".

Signed and Sealed this

Ninth Day of March, 1999

Attest:

Q. TODD DICKINSON

*Attesting Officer*     *Acting Commissioner of Patents and Trademarks*